Jan. 20, 1970  G. A. BONNER  3,490,818
SHAFT SEAL
Filed May 24, 1967  2 Sheets-Sheet 1
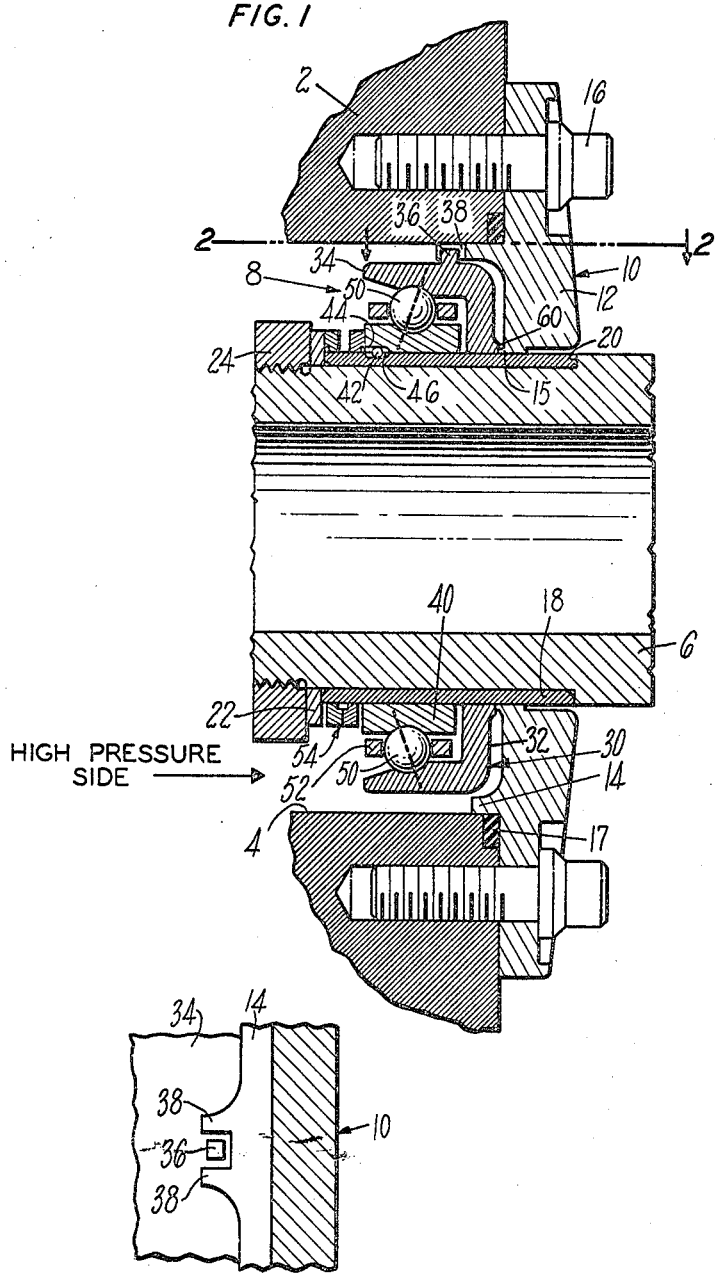
INVENTOR
GEORGE A. BONNER
BY Jack N. McCarthy
AGENT Jan. 20, 1970     G. A. BONNER     3,490,818
SHAFT SEAL Filed May 24, 1967     2 Sheets-Sheet 2

United States Patent Office 3,490,818
Patented Jan. 20, 1970

3,490,818
SHAFT SEAL
George A. Bonner, Palm Beach Gardens, Fla., assignor to United Aircraft Corporation, East Hartford, Conn., a corporation of Delaware
Filed May 24, 1967, Ser. No. 640,903
Int. Cl. F16c 1/24, 33/78, 33/72
U.S. Cl. 308—36.2                                   8 Claims

ABSTRACT OF THE DISCLOSURE

A sealing device wherein a rolling element is used to maintain a fixed radial clearance between a rotating surface and a stationary surface, said surfaces forming the primary seal surfaces. A rotating ring is positioned on a rotating shaft and an outer ring is fixed against rotation to a housing and contains a flange which extends towards a sealing surface on the shaft, this spacing being the distance between the primary sealing surfaces. This flange can have a sealing surface which will cooperate with a surface on a flange on said housing to provide secondary sealing surfaces with means being provided to bias said rotating ring, rolling elements and outer stationary ring together to insure positive contact of these elements.

BACKGROUND OF THE INVENTION

This invention is within a field of art wherein a positive clearance is maintained between two sealing surfaces in a radial direction to prevent binding and seizure between the parts rotating relatively to each other.

While the prior art is abundant relating to the sealing of a shaft rotating relative to a housing, labyrinth seals and floating ring seals using hydrodynamic forces for centering are the types which are most closely related to the subject disclosure. The common labyrinth seal while used successfully for some installations, results in excessive leakage in other applications. The floating ring seals have also been satisfactory in some applications while in others have been difficult to operate to maintain a minimum of leakage. This is especially true for fluids with low viscosity such as air, hydrogen, helium, etc. where the hydrodynamic forces tending to center a floating ring are small.

SUMMARY OF THE INVENTION

This shaft seal provides a centering means for a guided ring which does not depend on hydrodynamic forces. The seal provides a positive spacing of the primary seal surfaces by elements which are positioned between relatively moving parts in a manner so that positive contact is maintained between the parts and the rolling elements.

Since the clearance in the sealing surfaces is maintained at all operating speeds and loads, the seal does not rub on start up or at low speeds or during high load speeds. This seal is not limited by the heat buildup of contact seals and can run at high speeds and high pressures. This seal can be used with any fluid that will sustain the spacing elements and does not depend on a fluid of high viscosity for its operation. This guided ring seal provides a long, narrow passage in which the energy of the fluid leaking is dissipated by wall friction whereas a labyrinth seal presents a series of orifices through which the leaking fluid is throttled and then expanded into a volume.

DESCRIPTION OF THE DRAWINGS

FIGURE 1 is a sectional view through a portion of a housing and shaft mounted for rotation therein showing the guided ring shaft seal.

FIGURE 2 is a view taken along the line 2—2 of FIGURE 1.

FIGURE 3 is a view showing the annular spring used to bias the seal axially.

DESCRIPTION OF PREFERRED EMBODIMENTS

Figure 5:
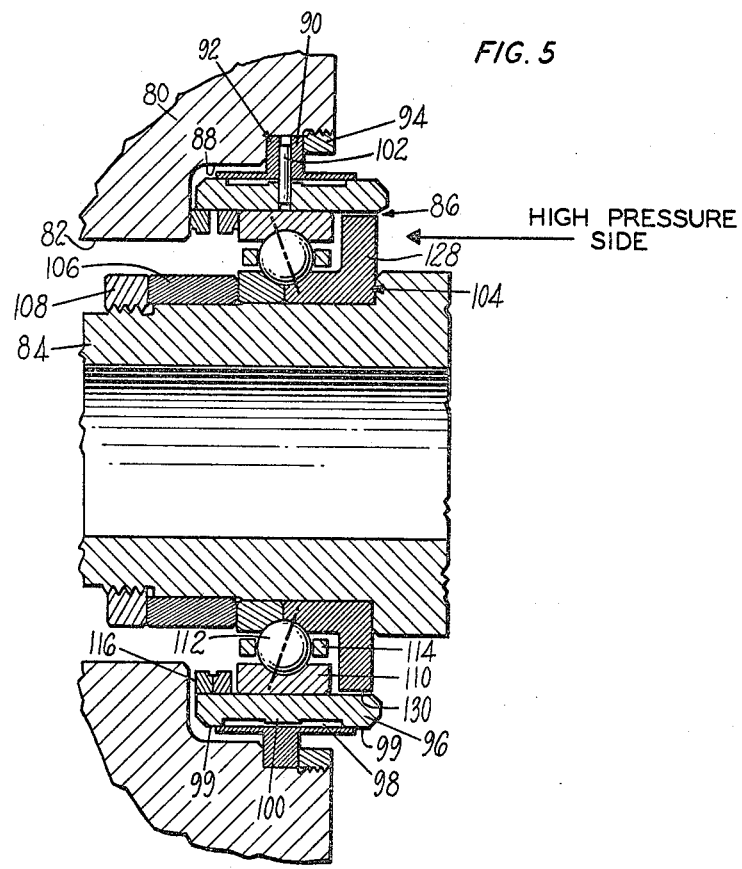
FIGURE 5 is a view similar to FIGURE 1 showing a modification of the seal wherein it can also serve as a bearing.
Figure 4:
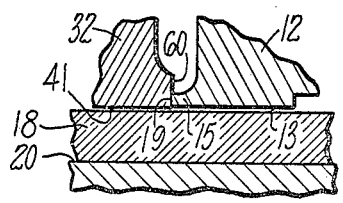
FIGURE 4 is an enlarged view of the surfaces of the sealing area of FIGURE 1.

As seen in FIGURE 1, a housing 2 has an opening 4 therein in which a shaft 6 is mounted for rotation. At the location of the sealing mechanism 8, an annular member 10 is positioned around the shaft 8 having a radial flange 12 extending toward the shaft and an axially extending flange 14 mating with the inner periphery of the opening 4. The radial flange 12 has an inwardly facing annular face formed with a surface 13 which is spaced from the sleeve 18 a distance approximately equal to the spacing of a labyrinth seal member. An annular axially extending flange 15 projects in the same direction as flange 14 and provides an extension for surface 13 along with an annular sealing surface 19 at the end of the annular flange 15. In this figure, annular member 10 is bolted in position by the use of bolts 16. A sealing washer 17 is located between said annular member 10 and housing 2.

A sleeve 18 is fixedly mounted on the outer surface of the shaft 6 for sealing cooperating with the inner free end of the radial flange 12. A sleeve is used to prevent the replacing of the entire shaft if the outer surface is rendered undesirable, and if necessary to provide a material whose thermal expansion is compatible with the parts of the seal to be hereinafter referred to so that the close primary seal clearance will be maintained, especially for cryogenic operating conditions. In this modification, the sleeve 18 is shown fixed in position between an annular abutment 20 on the shaft and a washer 22 held in place by a nut 24. This sleeve may be fixed in position by other known means.

A guided ring member 30 is positioned around said sleeve on the same side of the radial flange 12 that the axially extending flange 14 is located. This guided ring is formed having an inwardly extending radial flange 32 which extends substantially parallel to the radial flange 12 and an axially extending flange 34 is spaced outwardly from the sleeve 18 and running substantially parallel therewith. Inwardly extending radial flange 32 has an inner annular surface 41 spaced from the outer surface of the sleeve 18 a distance less than that between surface 13 and the sleeve 18, in a manner to be hereinafter described. To prevent the guided ring from rotating, a projection 36 extends radially outwardly from the outer surface of the axially extending flange 34 and is positioned between two projections 38 which project from the axially extending flange 14 of the annular member 10.

An inner ring member 40 is slideably mounted on the sleeve 18 radially inwardly from the axially extending flange 34, and is permitted limited axial movement on the sleeve while being prevented from rotation relative to said sleeve by the use of a ball 42 cooperating with a matching keyway 44 located in the end of the inner ring member 40 and keyway 46 located in the sleeve 18. Any other known anti-rotation mechanism which permits limited axial movement can be used.

Balls 50 are located between facing annular grooves in the facing surfaces of the axially extending flange 34 and inner ring 40 to maintain a fixed radial clearance between the outer surface of the sleeve 18 and the inner annular surface 41 formed by the end of the axially extending flange 32. The multiplicity of balls 50 are maintained in spaced relationship by a retainer 52.

An annular spring 54 is positioned between the end of said inner member adjacent the washer 32 and the washer 22 to insure positive contact between the inner ring 40 and the flange 34 through the balls 50 and to bias the surface 60 of the guided ring 30 and the mating surface 19 of the inwardly extending flange 15 together. The pressure of the sealed fluid also acts in this same manner. The annular grooves in the facing surfaces of the flange 34 and ring 40 are formed so that when the seal is in operation, the line of force acting through the balls is at a slight angle (see FIGURE 1) to permit the the balls to be in compression between the ring 40 and flange 34.

As seen in FIGURE 5, a housing 80 has an opening 82 therein in which a shaft 84 is mounted for rotation. At the location of the sealing mechanism 86, a recess 88 is formed in the housing. This sealing mechanism 86 includes an annular member 90 which is fixed at its outer edge to the housing and has a thin annular projection extending to each side of its inner edge thereof forming an inner cylindrical surface. The free ends of the annular projections acting as spring members as will be hereinafter described. The outer end of the member 90 is positioned in a countersunk recess 92 and held in place by an annular nut 94. A guided ring member 96 is positioned in the cylindrical surface of the annular member 90. The outer periphery of the guided ring 96 is formed having a recess 98 therein with an annular raised surface 99 on each side. When the guided ring 96 and the annular member 90 are assembled, the free ends of the inner cylindrical surface of the annular member extend over the outer ends of the recess 98 and engage the adjacent edges of the surfaces 99. It can be seen that radial movement of the guided ring member 96 will deflect the thin annular projections to provide for a small radial movement of the guided ring member 96. The center of the recess 98 has stop means 100 provided which limits the radial movement of the guided ring member. This stops means can be an annular projection or plurality of small projections around the periphery. A pin 102 fixes the guided ring member 96 against rotation with respect to annular member 90.

The outer surface of the shaft 84 has a split inner ring 104 mounted thereon between an abutment formed on the shaft and a spacer 106. A nut 108 holds this assembly in place. A radially extending flange 128 extends outwardly towards the inner surface of guided ring member 96 and has its outer end surface 130 spaced a predetermined distance from the inner surface. These surfaces form the seal.

An outer ring 110 slideably engages the inner periphery of the guided ring member 96. A plurality of balls 112 are located between facing annular grooves in the facing surfaces of the outer ring 110 and split inner ring 104; said annular groove in the surface of the split ring having approximately half of said groove formed on each part of the split ring. A multiplicity of balls 112 are maintained in spaced relationship by a retainer 114. An annular spring 116 is positioned between the end of the recess 88 and the adjacent end of the member 110 to insure positive contact between the split ring 104, the balls 112 and the outer ring 110. The annular grooves in the facing surfaces of the split ring 104 and outer ring 110 are formed so that when the seal is in operation, the line of force acting through the balls is at a slight angle (see FIGURE 5) to permit the balls to be in compression between the split ring 104 and outer ring 110.

In the seal shown in FIGURE 1, as the sealing surface of the sleeve 18 moves radially, the movement is transmitted through the inner ring member 40, balls 50 and guided ring member 30 to also move the sealing surface 41, thus preventing contact between these primary sealing surfaces. While the seal is in operation, the high pressure of the fluid on the seal side of annular member 10 along with annular spring 54 biases the secondary seal surfaces 60 and 19 together.

In the seal and bearing shown in FIGURE 5, it can be seen that a radial deflection of the shaft 84 at the seal location will move the sealing surface 130 of the radially extending flange 128 outwardly towards the mating seal surface portion of the guided ring member 96. However, as this surface 128 moves outwardly, this movement is transferred through the split inner ring 104, balls 112, the outer ring 110 and thereon to the guided ring member 96, thereby moving it radially outwardly and maintaining the sealing space between this surface 130 and the mating surface of member 96.

One seal was constructed having the configuration shown in FIGURE 1 wherein the outer surface of the sleeve 18 was formed having a diameter of approximately 2.5572″, the inner surface 13 was formed having a diameter of approximately 2.5680″ providing a clearance of approximately .0108″ and the surface 41 was formed having a diameter of approximately 2.5590″ providing a clearance of approximately .0018″.

What is claimed is:

1. In combination, a member having an opening therein, a shaft mounted for relative rotation in said opening, said member having a first radial flange extending radially inwardly towards said shaft, an annular member located around said shaft adjacent said first flange, said annular member having a second radial flange extending radially inwardly towards said shaft, each of said radial flanges having axially facing mating sealing surfaces at their ends adjacent said shaft, said annular member having an axially projecting flange extending away from said first radial flange, a ring slidably mounted on said shaft under said axially extending flange, said axially extending flange and said ring being spaced apart by a plurality of spacing members permitting relative rotation between said axially extending flange and ring, means fixing said annular member against relative rotation with said member, spring means on said shaft for biasing said ring towards said second radial flange to have positive engagement of said spacing members with said ring and axially extending flange, said spring action also pressing said mating sealing surfaces of the first and second radial flanges together.

2. In combination, an apparatus as set forth in claim 1 wherein said spacing members are rolling members.

3. In combination, an apparatus as set forth in claim 1 wherein said means for limiting the movement of said second radial flange includes cooperating secondary axially facing sealing surfaces on said first and second radial flanges.

4. In combination, an apparatus as set forth in claim 3 wherein said spring means also biases said secondary sealing surfaces together.

5. In combination, an apparatus as set forth in claim 1 wherein said spring means is on said shaft.

6. In combination, an apparatus as set forth in claim 1 wherein the unbalance in fluid pressure on each side of the second radial flange also insures contact of said secondary seal surfaces.

7. In combination, an apparatus as set forth in claim 1 wherein the surface of said shaft having cooperation with the first radial flange, first ring, spring means, and second radial flange is formed as a sleeve of the same material to insure proper operation.

8. In combination, a member having an opening therein, said opening being formed as a cylinder and having a first cylindrical surface, a shaft member mounted for rotation in said opening, said shaft member having a second cylindrical surface for sealing cooperation with said first cylindrical surface, said two surfaces being maintained concentric by a biased bearing means connected to said two surfaces, said biased bearing means comprising a first ring member slidably mounted axially on one of said surfaces, a second ring member being rigidly connected to the other surface by a first flange, said first and second ring members being mounted one within the other, said ring members each having a groove therearound, said grooves facing each other, a plurality of balls located in said grooves providing a ball bearing unit, said member having a housing therearound, a second flange extending inwardly from said housing towards said shaft member, said second flange being positioned adjacent said first flange connected to said second ring member, said member having an annular sealing surface thereon projecting towards said second flange, said second flange having a mating sealing surface for engagement with said annular sealing surface, means connecting said second ring to said housing to permit axial movement but restricting rotation therebetween, spring means for biasing said slidably mounted first ring member towards said first flange, this action places a force through said balls and centers said first cylindrical surface with said second cylindrical surface and presses said annular sealing surface against said mating sealing surface.

References Cited

UNITED STATES PATENTS

| | | | |
|---|---|---|---|
| 1,302,641 | 5/1919 | Lavaud | 308—187.1 |
| 1,324,756 | 12/1919 | Schatz | 308—187.1 X |
| 2,042,691 | 6/1936 | Williams | 308—36.2 |
| 2,623,764 | 12/1952 | Naylor | 277—53 |
| 2,859,261 | 11/1958 | Arbeit. | |
| 2,934,480 | 4/1960 | Slomin | 308—241 X |
| 2,990,220 | 6/1961 | Malone | 308—187.1 |
| 3,004,807 | 10/1961 | Kniepkamp | 308—187.1 |
| 3,061,822 | 10/1962 | Mitchell | 308—176 X |

FOREIGN PATENTS

| | | |
|---|---|---|
| 679,386 | 8/1939 | Germany. |
| 632,227 | 1/1962 | Italy. |
| 511,127 | 8/1939 | Great Britain. |
| 397,362 | 2/1966 | Switzerland. |

MARTIN P. SCHWADRON, Primary Examiner

L. L. JOHNSON, Assistant Examiner

U.S. Cl. X.R.

277—53; 308—187.1